US009052713B2

(12) United States Patent
Schulz et al.

(10) Patent No.: US 9,052,713 B2
(45) Date of Patent: Jun. 9, 2015

(54) METHOD FOR OPERATING A VEHICLE DURING COASTING

(71) Applicants: Udo Schulz, Vaihingen/Enz (DE); Rainer Bartsch, Schwieberdingen (DE)

(72) Inventors: Udo Schulz, Vaihingen/Enz (DE); Rainer Bartsch, Schwieberdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 31 days.

(21) Appl. No.: 13/932,583

(22) Filed: Jul. 1, 2013

(65) Prior Publication Data

US 2014/0012478 A1  Jan. 9, 2014

(30) Foreign Application Priority Data

Jul. 4, 2012 (DE) .......................... 10 2012 211 585

(51) Int. Cl.

| B60T 8/32 | (2006.01) |
|---|---|
| B60Q 1/00 | (2006.01) |
| G05D 1/00 | (2006.01) |
| B60W 30/16 | (2012.01) |
| B60W 30/18 | (2012.01) |

(52) U.S. Cl.
CPC ................. *G05D 1/00* (2013.01); *B60W 30/16* (2013.01); *B60W 30/18072* (2013.01); *B60W 2720/10* (2013.01)

(58) Field of Classification Search
CPC ........... G06K 9/00805; G06K 9/00791; B60Q 9/008; B60Q 1/1423; B60Q 2900/30; B60Q 9/007; B60W 2550/402; B60W 30/12; B60W 2420/40; B60W 2420/403; B60W 2550/308; B60R 21/0134; B60R 2021/0006; B60T 2201/022; B60T 2201/08; B60T 7/22
USPC ............ 701/93, 25, 96, 41, 71; 340/435, 436, 340/438, 439, 441; 180/170; 348/148
See application file for complete search history.

(56) References Cited

U.S. PATENT DOCUMENTS

| 2007/0185639 | A1* | 8/2007 | Osborn et al. .................. 701/71 |
|---|---|---|---|
| 2010/0079267 | A1* | 4/2010 | Lin .............................. 340/435 |
| 2011/0090339 | A1* | 4/2011 | Higgins-Luthman ......... 348/148 |
| 2011/0276216 | A1 | 11/2011 | Vaughan |
| 2012/0083985 | A1* | 4/2012 | Johansson et al. .............. 701/93 |

FOREIGN PATENT DOCUMENTS

| DE | 10 2006 054 327 | 5/2008 |
|---|---|---|
| DE | 10 2006 059 915 | 7/2008 |
| DE | 10 2009 015 170 | 10/2009 |
| DE | 10 2008 039 950 | 3/2010 |
| JP | 2008-162564 | * 7/2008 |

* cited by examiner

*Primary Examiner* — Muhammad Shafi
(74) *Attorney, Agent, or Firm* — Kenyon & Kenyon LLP

(57) ABSTRACT

A method for controlling a vehicle, including determining a speed curve on a coasting route, in order to let the vehicle on the coasting route coast from an actual speed to a setpoint speed, detecting an additional vehicle approaching the vehicle from behind on the coasting route, and raising the speed of the vehicle compared to the determined speed behavior on the coasting route, in order to produce a predetermined threshold distance from the additional vehicle.

16 Claims, 4 Drawing Sheets

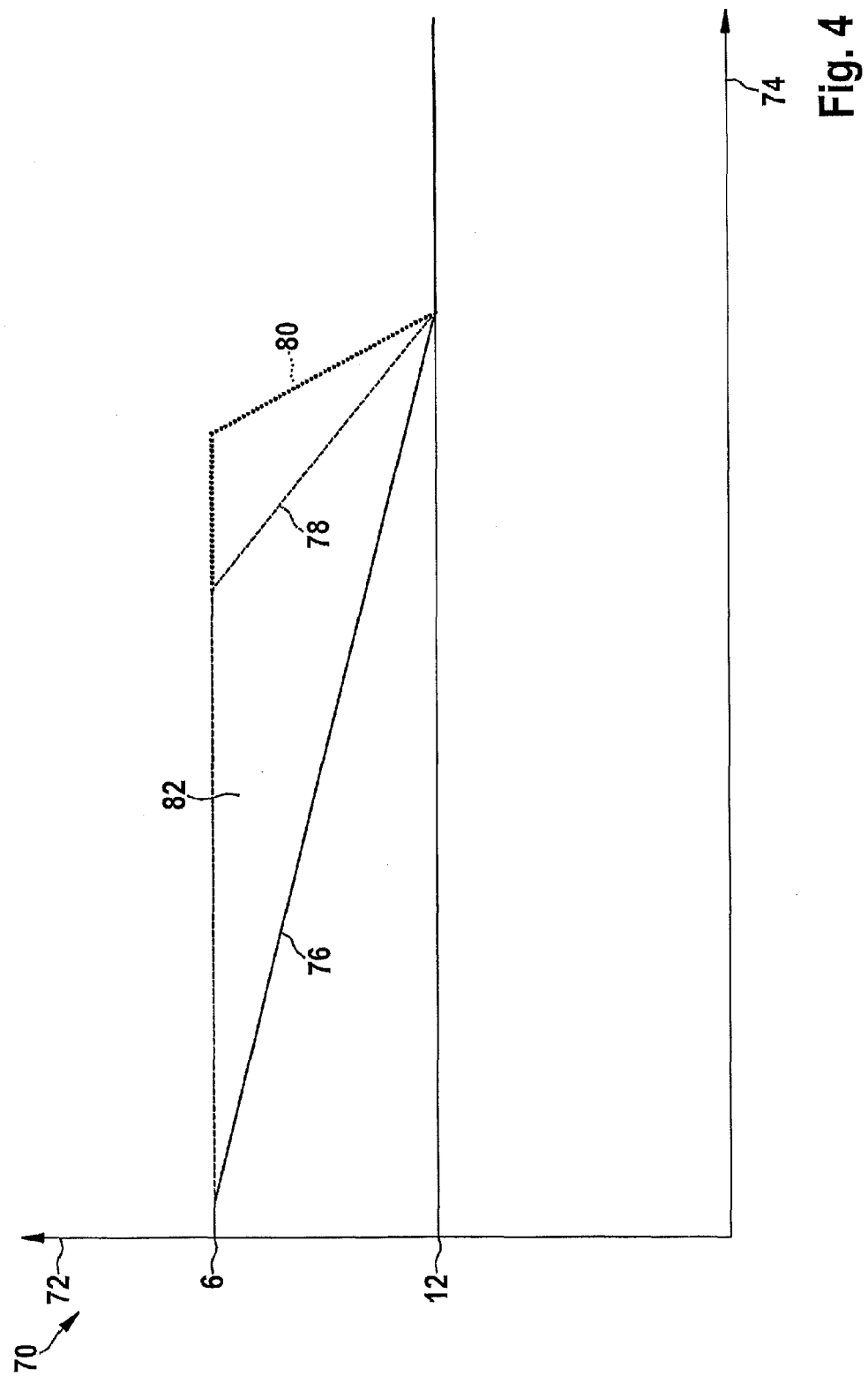

METHOD FOR OPERATING A VEHICLE DURING COASTING

CROSS REFERENCE

The present application claims the benefit under 35 U.S.C. §119 of German Patent Application No. DE 102012211585.4 filed on Jul. 4, 2012, which is expressly incorporated herein by reference in its entirety.

FIELD

The present invention generally relates to vehicles, especially vehicles having a coasting assistant. Furthermore, the present invention relates to a method for operating a vehicle during coasting.

BACKGROUND INFORMATION

A method is described in German Patent Application No. DE 10 2006 054 327 A1 for momentum utilization of a motor vehicle. Within the scope of this method, based on an actual speed of a vehicle and a setpoint speed to be attained in the travel direction of the vehicle, a coasting path is ascertained, using which the vehicle is able to coast along a route without fuel consumption and is able to coast without a braking intervention from the actual speed to the setpoint speed. This system is also called "coasting assistant".

SUMMARY

In accordance with the present invention, a method for an energy management of a vehicle, a control device, and a vehicle having the control device are provided.

According to a first aspect of an example embodiment of the present invention, a method is provided for controlling a vehicle that includes the following:
 determining a speed behavior on a coasting route, in order to let the vehicle on the coasting route coast from an actual speed to a setpoint speed;
 detecting an additional vehicle approaching the vehicle from behind on the coasting route; and
 raising the speed of the vehicle compared to the determined speed behavior on the coasting route, in order to produce a predetermined threshold distance from the additional vehicle.

The example method is based on the idea that in a vehicle, a coasting assistant having knowledge of an admissible speed, such as with the aid of speed signs or having the knowledge of a possible speed, for example, for the safe driving through a curve along a travel route known ahead of time, which may be known from the navigation system, could, for instance, output to the driver in time a recommendation of taking his foot off the accelerator, in order to avoid, using the vehicle at a later time or route section, a braking maneuver and, with that, an energy dissipation via the brakes. With that, the vehicle coasts in principle. The coasting assistant could also actively intervene in the vehicle via a vehicle speed controller, and end the increase in the speed of the vehicle compared to the predetermined speed behavior.

Based on this, a possible disadvantage of the coasting assistant that vehicles following the vehicle, not having this coasting assistant and/or the exact route knowledge, feel thwarted and may perhaps begin to tailgate. Independent of this, the driver might feel tailgated having an activated coasting assistant, since the reason for on-time deceleration of the vehicle having coasting assistants is not always obvious to the other traffic participants because, for instance, the speed-limiting sign, the sharp curve or a possible downhill grade cannot be seen yet. Such traffic situations could also lead the driver to be afraid to use the coasting assistant.

Insecure drivers of a vehicle, in particular, could become restless in such driving situations, and could react in a dangerous manner as far as the traffic is concerned.

In order to avoid this endangerment to the traffic, in accordance with the present invention, in these cases, for the sake of traffic safety, the energy dissipation via the brake is not permitted, but the vehicle is accelerated within the scope of the prevailing traffic rules and the traffic safety existing at the corresponding road section. It is true that, compared to the current coasting assistant, a lower consumption savings potential is realized, since the driver probably thus has to initiate a braking process, but the acceptance of the coasting assistant by the driver and the safety are clearly increased. Alternatively it may also be provided that the coasting recommendation to the driver should be delayed or not issued at all, under certain circumstances.

In one refinement of the example method, the speed of the vehicle on the coasting route is only increased, compared to the speed behavior determined, if a certain switch on the vehicle is activated. This switch may be any switch which activates either only the speed increase with respect to the determined speed behavior, when the coasting assistant is activated, or activates another system that is able to intervene in the acceleration of the vehicle when the coasting assistant is activated. Such a system would be, for example, conventional Adaptive Cruise Control "ACC". Its basic principles are based on a vehicle speed regulation that is also known as Tempomat (e.g., cruise control), which holds to a desired speed specified by the driver. In addition, the ACC is, however, also able to adapt the speed of the vehicle to the changing traffic conditions by automatically increasing the speed of the vehicle on the coasting route, compared to the determined speed behavior, by giving less gas or by braking. This system thus allows the maintaining of a distance from a preceding vehicle that is a function of the speed.

In a further development of the method mentioned, the increase in the speed of the vehicle is ended on the coasting route if the vehicle falls below a predetermined safety distance from a preceding vehicle. In this way, it is ensured that, within the scope of the method mentioned, no rear-end collisions will occur because of safety distances that were too low.

In a further development of the method mentioned, the increase in the speed of the vehicle is ended on the coasting route if the vehicle reaches an admissible maximum speed. This ensures that, within the scope of the method mentioned, the road traffic rules are maintained, or that no situation critical to traffic will occur due to excessive speed.

In order to avoid one of these situations critical to traffic, the admissible maximum speed may be made a function of the admissible cornering speed, so that, within the scope of the method mentioned, the vehicle is able to traverse curves on the road safely.

In a further development of the method mentioned, the increase in the speed of the vehicle is ended on the coasting route if a passing process by the additional vehicle approaching from behind is detected. The passing process may be detected in any way desired. Thus, it would be possible to scan the rear of the vehicle using distance sensors, and to detect the passing process if the distance sensors again detect a sufficiently great distance of the additional vehicle traveling behind. However, in a particularly preferred manner, the passing process may be detected using image technology, such as by using a camera, whereby the passing process may already be detected if the additional vehicle is still located behind the vehicle that is executing the method mentioned. By ending the increase in speed in the case of the passing process, one may avoid an unnecessary acceleration, and with that, an unnecessary subsequent braking intervention.

In one particular refinement of the example method, a minimum braking distance is determined to a position at which the setpoint speed is supposed to be achieved, and the increase in speed of the vehicle on the coasting route is ended if the minimum stopping distance to the position, at which the setpoint speed is to be reached, has been reached. The minimum stopping speed may composed in any way desired. Thus, the minimum stopping distance may include a minimum braking distance of the vehicle plus a safety factor for the uncertainty of the prognosis. The minimum stopping distance may also be fixedly specified, however, or be oriented to other criteria. Because of the ending of the increase in speed when the minimum stopping distance has been reached, it is ensured that the vehicle is also certainly able to reach the setpoint speed, in spite of the method mentioned, if a vehicle is traveling behind the one that is carrying out the example method.

In one preferred refinement of the example method, a required braking process is displayed to the driver if the minimum braking distance at which the setpoint speed is to be reached, has been reached. In this way, the driver of the vehicle is able to react and is now able to initiate the required braking process based on the increase in the speed carried out because of the method mentioned.

In one alternative or additional refinement of the method, a recommendation is output to the driver on the coasting route, for instance, via a display, that he should operate the brake pedal if the minimum braking distance has been reached.

In a particularly preferred development of the method, the increase in the speed of the vehicle is ended on the coasting route if the driver of the vehicle operates the brake of the vehicle. In this way, the braking process is given priority within the scope of the method.

In another refinement of the method, the driver is notified via a display that braking the vehicle is required in spite of a switched-on coasting assistant. This ensures that the driver does not rely upon the coasting assistant, in order not to get into a traffic situation that is dangerous and/or against the rules.

Consequently, two different displays may optionally be present in the vehicle. While the one display tells the driver that he must immediately initiate a braking process, so as to reach the setpoint speed at a certain location ahead on the road, the further display indicates to the driver, independently of time, whether a braking process is necessary at all to reach the setpoint speed, so that the driver is able to decide for himself when to initiate the braking process. The first of the two displays could also be connected to a driver assistance system, in this instance, which initiates the immediately required braking process.

In one alternative or additional development of the example method, the increase in the speed of the vehicle is ended on the coasting route if a braking distance for recuperative braking up to the reaching of the setpoint speed has been reached. By recuperative braking, the kinetic energy of the vehicle is able to be temporarily stored in an energy store, such as a battery. In this way, after the braking of the vehicle, the temporarily stored kinetic energy may, for example, be drawn upon again for an acceleration.

In one alternative or additional refinement of the example method, the increase in speed of the vehicle on the coasting route is ended if the vehicle reaches a predetermined speed, which is composed of a predetermined absolute speed amount or a speed amount or relative speed amount which is added to a speed behavior originally prognosticated by the coasting assistant on the coasting route. The predetermined speed yielded, in this instance, is able to deviate positively from the speed behavior originally prognosticated by the coasting assistant. In this way, with the aid of gas consumption data, which are then recalculated to give the speed amount, the driver is able to determine specifically how much energy he would like to dissipate on the coasting route by the braking process now to be initiated.

In one alternative or additional refinement of the example method, the increase in speed of the vehicle on the coasting route is ended if the vehicle reaches a predetermined speed, which is composed of a predetermined absolute speed amount or a speed amount or relative speed amount which is subtracted from an admissible maximum speed on the coasting route. The resulting predetermined speed may, in this instance, deviate negatively from the admissible maximum speed on the coasting route.

According to another aspect, a control device is provided, which is set up to implement the indicated method.

Furthermore, the control device may include a memory and a processor. The described method is stored in the memory in the form of a computer program, and the processor is provided to implement the method when the computer program is loaded from the memory into the processor.

According to one further aspect, a vehicle is provided which includes said control device.

BRIEF DESCRIPTION OF THE DRAWINGS

Preferred specific embodiments of the present invention are explained in greater detail below with reference to the figures.

FIG. 4 shows a diagram having various speed curves.

DETAILED DESCRIPTION OF EXAMPLE EMBODIMENTS

Figure 1:
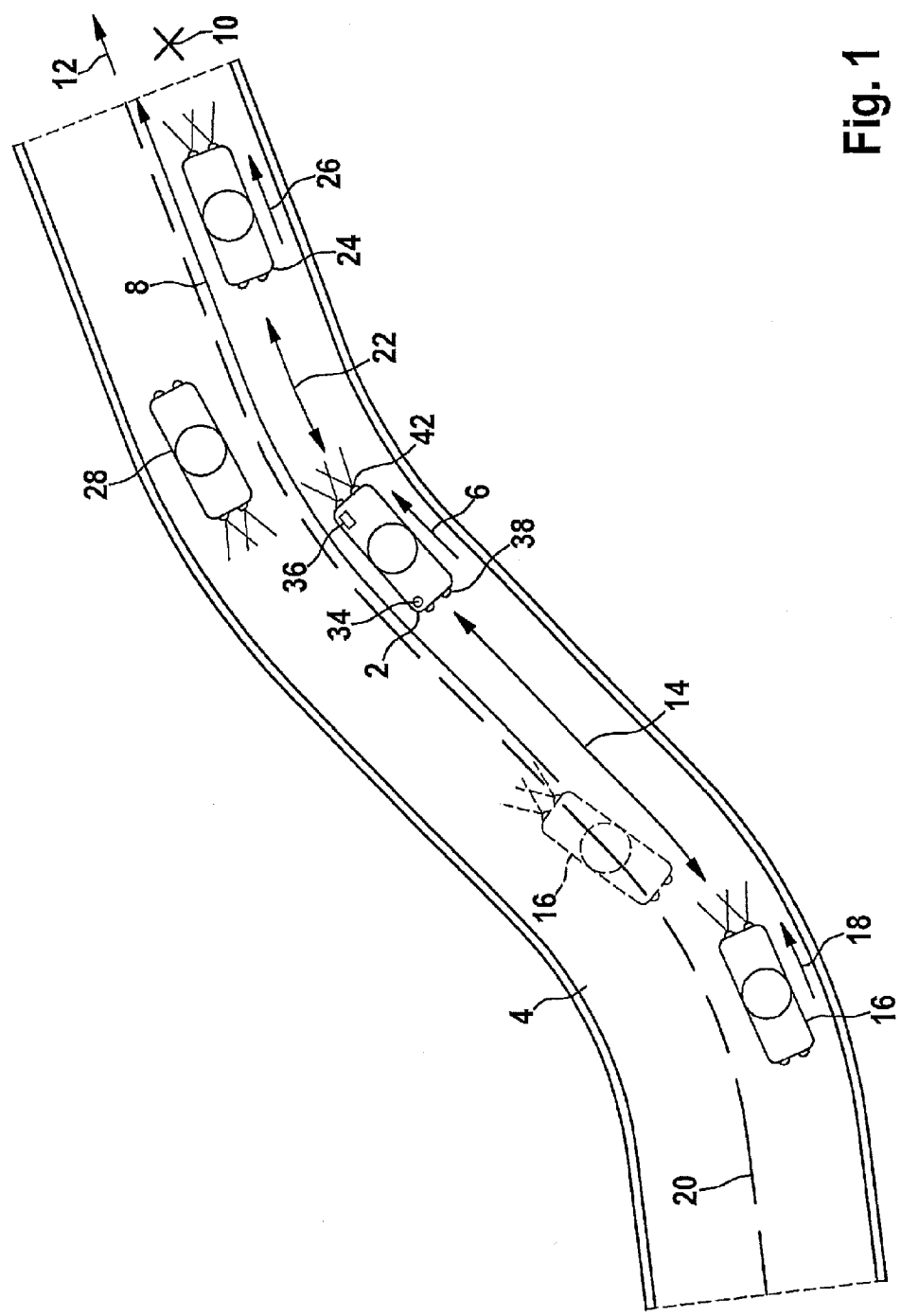
FIG. 1 shows a schematic view of a vehicle on a road.

In the figures, the same elements are provided with the same reference numerals and are described only once.

Reference is made to FIG. 1, which provides a schematic view of a first vehicle 2 on a road 4.

First vehicle 2 is moving on road 4 at an actual speed 6 in a travel direction corresponding to actual speed 6. In this context, first vehicle 2 is moving on a coasting route 8. On coasting route 8, first vehicle 2 is not to be supplied with any kind of energy, for instance by an internal combustion engine or an electric motor, so that first vehicle 2 coasts, and is slowed down, at a position 10 in the travel direction before first vehicle 2, to a setpoint speed 12.

As seen in the travel direction of first vehicle 2, at a first distance 14 behind first vehicle 2, there is a second vehicle 16, which is moving forward at a corresponding speed 18. In the present embodiment, a planned passing process of second vehicle 16 is characterized in that a version of second vehicle 16, shown by dashed lines, is crossing a center line 20 of road 4.

As seen in the travel direction of first vehicle 2, at a second distance 22 before first vehicle 2, there is a third vehicle 24, which is moving forward at a corresponding speed 26.

In addition, a fourth vehicle 28 is coming towards first vehicle 2, as seen in the travel direction of first vehicle 2.

Figure 2:
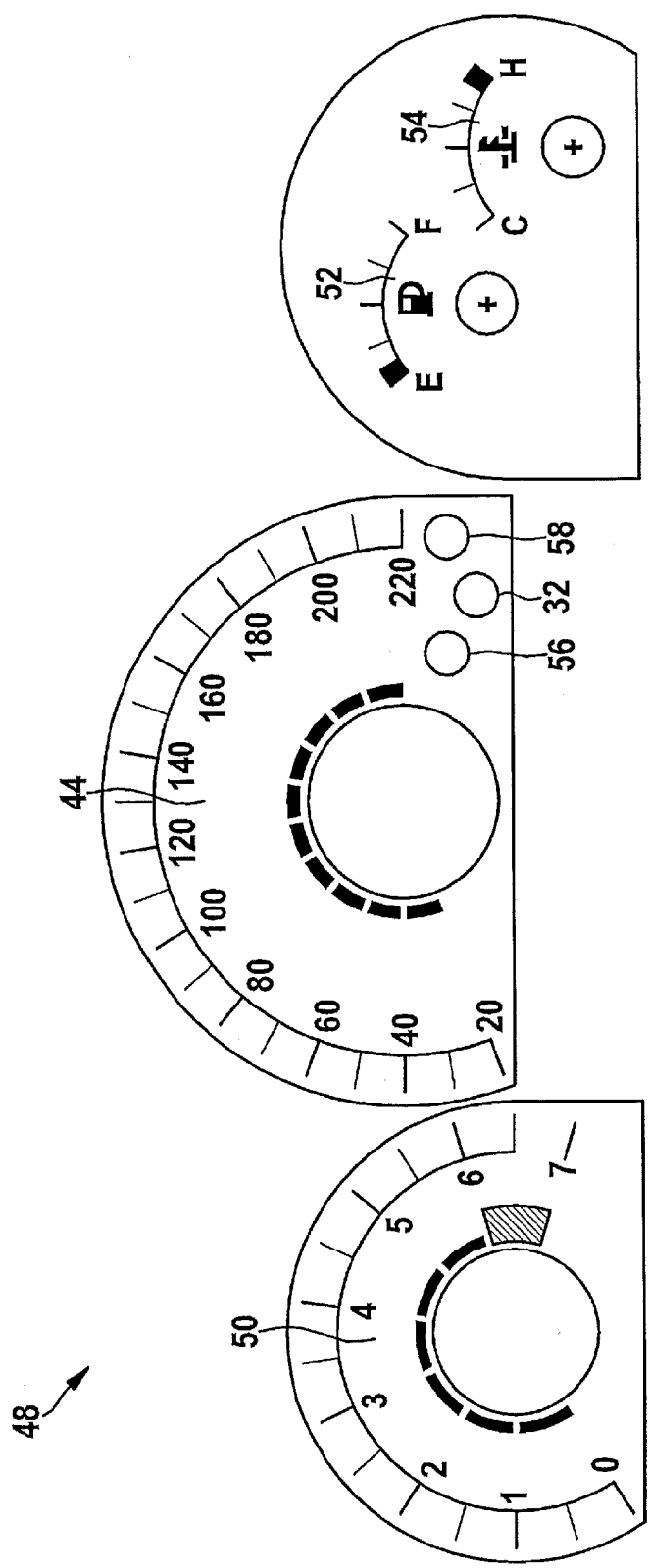
FIG. 2 shows a schematic view of an instrument panel of the vehicle of FIG. 1.
Figure 3:
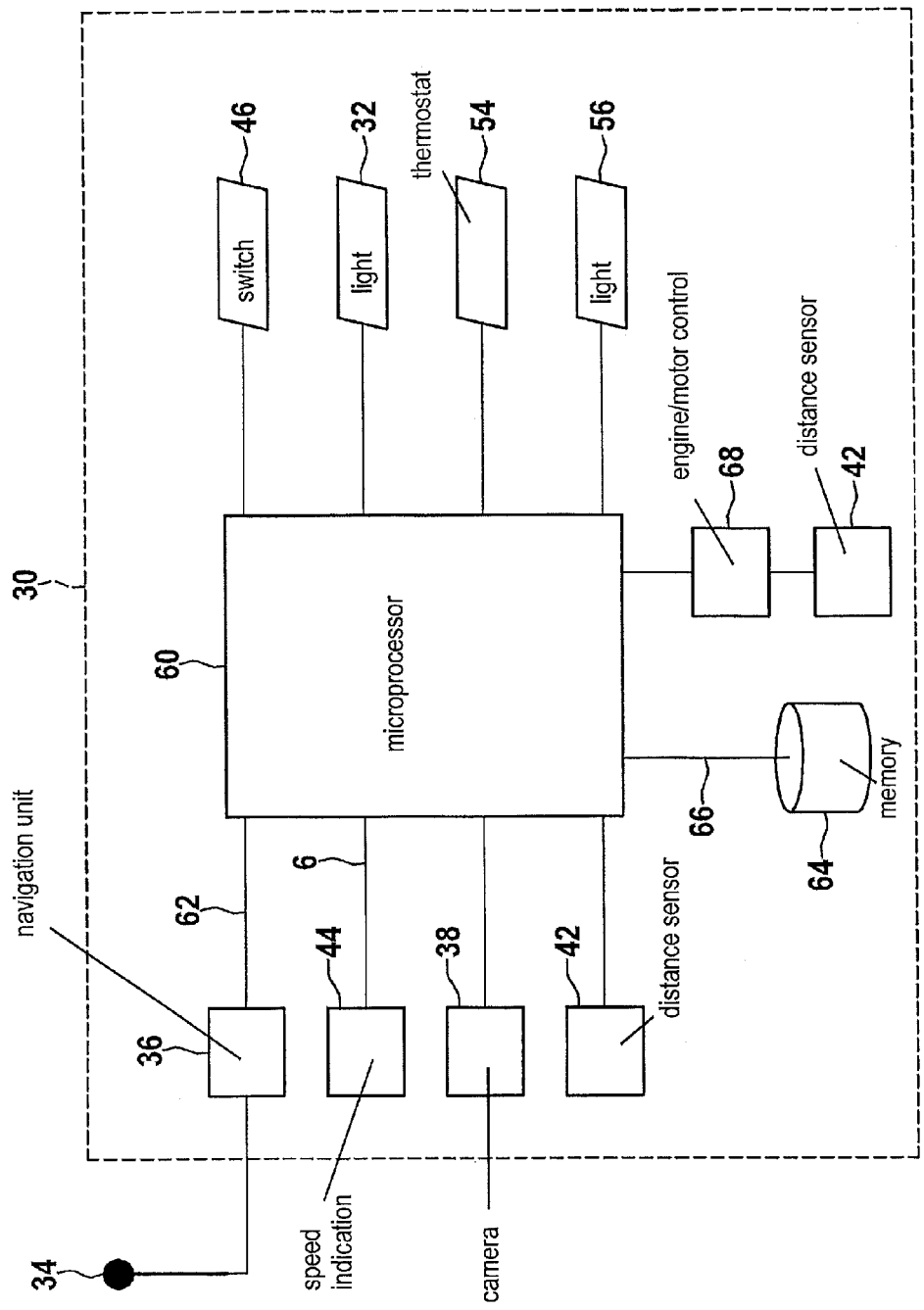
FIG. 3 shows a structural view of a control device in the vehicle of FIG. 1.

Coasting route 8 having the abovementioned properties, is determined by a coasting assistant 30, into the technical details of which we shall go in greater detail within the scope of FIG. 3. If the vehicle is located on a coasting route 8, coasting assistant 30 will give the driver, via a small first light 32, shown in FIG. 2, a recommendation not to actuate further the accelerator of first vehicle 2, so that first vehicle 2 keeps coasting.

In the present embodiment, in the travel direction of first vehicle 2, behind the position of first vehicle 2 shown in FIG. 1, coasting assistant 30 has detected, via a navigation unit 36, a position 10, at which first vehicle 2 is to travel at setpoint speed 12, and determines coasting route 8 in a manner still to be described. Since first vehicle 2 is traveling on coasting route 8, coasting assistant 30 outputs the abovementioned recommendation on first little light 32.

While first vehicle 2 is traveling on coasting route 8, coasting assistant 30 further monitors oncoming traffic behind first vehicle 2, via a camera 38 mounted on the rear of first vehicle 2. Furthermore, coasting assistant 30 has a speed controller 40 shown in FIG. 3, in the present embodiment.

Within the scope of this example embodiment, it should be assumed that speed 18 of second vehicle 16 is greater than actual speed 6 of first vehicle 2. Speed 18 of second vehicle 16 and/or first distance 14 between first and second vehicle 2, 16 may be recorded by camera 38, for example. If speed 18 is too great and/or first distance 14 is too low, which may be determined, for example, by comparisons of these variables to suitable threshold values, speed controller 40 is able to intervene in first vehicle 2, and accelerate it, in order to keep first distance 14 at a predetermined value, which may be independent of speed and the roadway. In this way, it is avoided that the driver of first vehicle 2 feels tailgated by second vehicle 16, and thus goes into a traffic-endangering situation.

In order to avoid additional traffic-endangering situations, coasting assistant 30 is able to end the one increase in speed compared to a speed suitable for coasting under certain conditions, whose presence is able to be checked using camera 38, navigation unit 36 or further sensors.

Via a distance sensor 42 in front of first vehicle 2, coasting assistant 30 is able to record second distance 22 from third vehicle 24 in front of first vehicle 2, and end the intervention of speed controller 40, if this second distance is too low.

Via a speed display 44 shown in FIG. 2, coasting assistant 30 is able to record actual speed 6 of first vehicle 2, and compare this to a maximum speed on road 4 received, for instance, via navigation unit 36. If actual speed 6 exceeds this maximum speed, the intervention of speed controller 40 may also be ended. However, the maximum speed may also be yielded, depending on the situation, for example, by cornering, in which first vehicle 2 must not break out of the curve.

Via camera 38, coasting assistant 30 may detect, for example, whether second vehicle 16 is making an attempt at passing, behind first vehicle 2, as shown in FIG. 1. In this case, the intervention of the speed controller may also be ended.

Coasting assistant 30 may also take into account whether first vehicle 2 could still come to a standstill in time, even while using a brake present in vehicle 2. If a critical minimum braking distance, not shown in more detail in FIG. 1, is exceeded in this case, the intervention of speed controller 40 may be ended too. This minimum braking distance may be composed of different items of information, such as the minimum braking distance of first vehicle 2, the reaction time of the driver that is to be expected and a safety factor. In addition, the minimum braking distance may first be calculated, for example, for a possible recuperation of kinetic energy based on a corresponding braking intervention, and subsequently once again for a hard braking intervention in which kinetic energy of the vehicle is dissipated.

Numerous additional conditions are possible which the coasting assistant could take into account as a criterion for ending the intervention of the speed controller, which we shall not mention here for the sake of brevity.

Finally, the intervention of speed controller 40 in first vehicle 2 is altogether admissible only if a corresponding switch 46, shown in FIG. 3, is also activated, so that the driver himself is able to decide whether he wants to take on the situation of the second vehicle traveling behind him, for instance, because his "nerves" are sufficiently strong or because on road 4 there are sufficient passing possibilities.

Reference is made to FIG. 2, which shows a schematic view of an instrument panel 48 of first vehicle 2.

Instrument panel 48, besides speed display 44, includes a conventional speed indication 50, a conventional fuel level reading 52, and a conventional thermostat indication 54.

In the present embodiment, first little light 32, for outputting the recommendation of not further operating the accelerator, is situated below speed indicator 44.

To the left of first little light 32 there is situated a second little light 56, via which the driver may be given information as to whether he is at all able still to reach setpoint speed 12 at position 10 without a braking intervention. Thus, if second little light 56 lights up, it tells the driver that he is moving faster than a coasting speed suggested by coasting assistant 30 on coasting route 8.

To the right of first little light 32 there is situated a third little light 58, via which the driver may be given information as to whether he has to brake immediately to reach setpoint speed 12 at position 10. If third little lamp 58 lights up, it is pointed out that the driver should brake immediately. This may additionally or alternatively be output acoustically, it being also conceivable that, if there is an immediate necessity for braking, an appropriate driver-assistance system could also intervene. The function of third little light 58 could be replaced by a blinking second little light 56. Little lights 32, 56, 58 could also be replaced by displays of plain text in a display.

Reference is made to FIG. 3, which shows a structural view of a driver assistance system 30 of first vehicle 2.

Coasting assistant 30 includes a microprocessor 60 as a central data.-processing device, and is connected to navigation unit 36. Furthermore, microprocessor 60 is connected to speed indication 44, which is able to determine actual speed 6 of first vehicle 2 via an odometer. Alternatively, however, actual speed 6 may also be recorded via navigation unit 36, which is why the connection to speed indicator 44 is optional. Position data 62 determined by navigation unit 36 and actual speed 6 measured by speed indication 44 are each transmitted to microprocessor 60 which, based on these data received, calculates coasting route 8 and a corresponding starting point of coasting route 8. The ascertainment of coasting route 8 and the starting point of coasting route 8 is repeated regularly, and consequently, a continuous recalculation takes place.

A memory 64 is also provided, in which the vehicle-specific characteristic data 66 of first vehicle 2 are stored. These vehicle-specific characteristic data 66 are jointly taken into account in the ascertainment of coasting route 8 and the starting point of coasting route 8. Thus, for example, the inertia of first vehicle 2 has an effect on coasting route 8. The memory may be, for instance, a single read/write memory or alternatively, may have a plurality of physically separate memories for different memory functions in each case. The memory may be a CD-ROM, a DVD, an SD card or any other suitable storage medium.

The values of usual speed behavior during the coasting of first vehicle 2 are specified as a function of the type of coasting befitting the vehicle and the driver of the vehicle, that is, specified by the microprocessor, with or without engine/motor braking, for the current type of first vehicle 2, in the case of various uphill grades, payloads and wind conditions. These stipulations may also be stored in memory 64. Coasting route 8 and its starting point are calculated while using access to these stipulations from memory 64.

Coasting assistant 30 is connected to switch 46 in the manner already mentioned, which activates or deactivates coasting assistant 30. Finally, the coasting assistant is connected to the three little lights 32, 58, 56, which were explained within the scope of FIG. 2. Additional arrangements for acoustical and/or optical output, for instance, in order to indicate the braking process required immediately, have not been shown for the sake of clarity.

In order to initiate the coasting process automatically, and to interrupt the abovementioned internal combustion engine and/or electric motor, microprocessor 60 in the exemplary embodiment is connected to an engine/motor control 68. Engine/motor control 68 is then able to control the system at the optimal time into the engine overrun condition or coasting, that is, declutching and regulating the internal combustion engine and/or the electric motor down or shutting them down altogether. In this context, the declutching is only necessary if the torque transmission to a wheel of first vehicle 2 from the internal combustion engine and/or the electric motor also runs via a clutch. Engine/motor control 68 registers when the driver operates the brake pedal of first vehicle 2 or operates the accelerator more strongly, and then reconnects again the internal combustion engine/electric motor. The coasting is able to be controlled, for example, by a suitable software clutching of the components navigation, transmission control, ABS controller and motor management.

In the case of a semiautomatic coasting, that is, at a given time, the driver has sent to him via first little light 32 an optical and/or, via a loudspeaker not shown, an acoustical information signal, he takes his foot off the accelerator himself (overrun operation towing/overrun operation coasting) or he declutches optionally in addition (coasting engine in idle or engine off).

In order to determine a possibly required intervention of coasting assistant 30 in the acceleration of first vehicle 2 under the assumptions described above, and in the manner described above, the microprocessor is also connected to camera 38 and distance sensor 42. Should the intervention be necessary, microprocessor 60 is able to actuate speed controller 40 via engine/motor control 68, for example, within the scope of a vehicle assistance system, for example, or of a tempomat, the speed controller might be there anyway and be connected in the present embodiment to engine/motor control 68.

Speed controller 40 is also able to be switched off again via engine/motor control 68, if this is necessary based on the abovementioned assumptions.

Reference is made to FIG. 4, which shows a diagram 70 in which speeds 72 are plotted over time 74 with the aid of three speed curves 76, 78, 80.

The first speed curve 76 indicates speed 70 of vehicle 2, which it should have on coasting route 8 in the ideal case over time 74, in order to coast from actual speed 6 to setpoint speed 12 without further braking intervention. In first speed curve 76, it was assumed that the vehicle is moving on a level route. Other speed curves are able to come about if vehicle 2 is traveling on a hill, going up or down.

Second speed curve 78 indicates a speed 70 of vehicle 2 over time 74, in which, by a braking intervention, the kinetic energy difference between actual speed 6 and setpoint speed 12 is able to be recovered.

By contrast, third speed curve 80 indicates a speed 70 of vehicle 2 over time 74, in which, by a braking intervention, the kinetic energy difference between actual speed 6 and setpoint speed 12 can no longer be recovered and is consequently dissipated.

Thus, in the case shown in FIG. 3, for the planning of a speed curve suitable for vehicle 2 for braking from actual speed 6 to setpoint speed 12, coasting assistant 80 is able to use an area 82 which lies between first speed curve 76 and second speed curve 78. Speed curves outside of this area 82 would then be selected in the manner described above only if vehicle 16 is approaching at too high a speed 18 and/or distance 14 becomes too small.

What is claimed is:

1. A method for controlling a vehicle, the method comprising:
   determining, by a processor, a speed versus time curve from an actual speed to a setpoint speed for a speed behavior of the vehicle on traveling on a coasting route, wherein the coasting route is a route throughout which fuel consumption is not used for the traveling of the vehicle;
   determining, by the processor, that an additional vehicle is approaching the vehicle from behind on the coasting route;
   raising, by the processor, a speed of the vehicle on the coasting route to produce a predetermined threshold distance from the additional vehicle, wherein the raised speed of the vehicle is greater than a speed that corresponds to the speed behavior of the determined speed versus time curve;
   determining a minimum braking distance to a position at which the setpoint speed is supposed to be reached; and
   ending the raising of the speed of the vehicle if the minimum braking distance to the position at which the setpoint speed is to be reached, has been reached.

2. The method as recited in claim 1, wherein the raising includes raising the speed of the vehicle on the coasting route if a certain switch on the vehicle is activated.

3. The method as recited in claim 1, further comprising:
   ending the raising of the speed of the vehicle if the vehicle falls below a predetermined safety distance from a preceding vehicle.

4. The method as recited in claim 1, comprising:
   ending the raising of the speed of the vehicle if an admissible maximum speed has been reached.

5. The method as recited in claim 4, wherein the admissible maximum speed is a function of an admissible cornering speed.

6. The method as recited in claim 1, further comprising:
   ending the raising of the speed of the vehicle if a passing process of the additional vehicle approaching from behind has been detected.

7. The method as recited in claim 1, further comprising:
   indicating a necessary braking process if the minimum braking distance to the position, at which the setpoint speed is to be reached, has been reached.

8. The method as recited in claim 1, wherein, when the vehicle is on the coasting route, no braking intervention is performed for operation of the vehicle.

9. A control device to control a vehicle, the control device comprising:
a processor with which the control device is configured to:
determine a speed versus time curve from an actual speed to a setpoint speed for a speed behavior of the vehicle on traveling on a coasting route, wherein the coasting route is a route throughout which fuel consumption is not used for the traveling of the vehicle;
determine that an additional vehicle is approaching the vehicle from behind on the coasting route;
raise a speed of the vehicle on the coasting route to produce a predetermined threshold distance from the additional vehicle, wherein the raised speed of the vehicle is greater than a speed that corresponds to the speed behavior of the determined speed versus time curve;
determine a minimum braking distance to a position at which the setpoint speed is supposed to be reached; and
end the raising of the speed of the vehicle if the minimum braking distance to the position at which the setpoint speed is to be reached, has been reached.

10. The control device as recited in claim 9, wherein the raising of the speed includes raising the speed of the vehicle on the coasting route if a certain switch on the vehicle is activated.

11. The control device as recited in claim 9, wherein the control device is configured to end the raising of the speed of the vehicle if the vehicle falls below a predetermined safety distance from a preceding vehicle.

12. The control device as recited in claim 9, wherein the control device is configured to end the raising of the speed of the vehicle if an admissible maximum speed has been reached.

13. The control device as recited in claim 12, wherein the admissible maximum speed is a function of an admissible cornering speed.

14. The control device as recited in claim 9, wherein the control device is configured to end the raising of the speed of the vehicle of the vehicle if a passing process of the additional vehicle approaching from behind has been detected.

15. The control device as recited in claim 9, wherein the control device is configured to provide an indication of a necessary braking process if the minimum braking distance to the position, at which the setpoint speed is to be reached, has been reached.

16. The control device as recited in claim 9, wherein, when the vehicle is on the coasting route, no braking intervention is performed for operation of the vehicle.

* * * * *